United States Patent
Haase et al.

(10) Patent No.: US 11,137,124 B2
(45) Date of Patent: Oct. 5, 2021

(54) ANTI-GLARE HEADLAMP AND MOTOR VEHICLE

(71) Applicant: Hella GmbH & Co KGaA, Lippstadt (DE)

(72) Inventors: Christian Haase, Erwitte (DE); Julien Hansen, Delmenhorst (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/017,209

(22) Filed: Sep. 10, 2020

(65) Prior Publication Data
US 2021/0071838 A1 Mar. 11, 2021

(30) Foreign Application Priority Data
Sep. 10, 2019 (DE) .................... 10 2019 124 200.2

(51) Int. Cl.
*F21S 41/141* (2018.01)
*F21S 41/151* (2018.01)
(Continued)

(52) U.S. Cl.
CPC .......... *F21S 41/151* (2018.01); *F21S 41/143* (2018.01); *F21S 41/65* (2018.01); *F21S 41/67* (2018.01)

(58) Field of Classification Search
CPC ........ F21S 41/151; F21S 41/143; F21S 41/13; F21S 41/285; F21S 41/365; F21S 41/25; F21S 41/141; F21S 41/24; B60Q 2300/42; B60Q 1/1423; B60Q 2300/054; B60Q 2300/056; B60Q 1/28; B60Q 1/30; B60Q 1/14; B60Q 1/143; B60Q 2300/00; H01L 33/46; H01L 31/02325; H01L 31/02327; H01L 33/58; H01L 27/14643; F21V 23/0442; G05D 1/0242; G01S 17/931; G01S 17/42; G01S 17/89; G01S 17/06;
(Continued)

(56) References Cited

U.S. PATENT DOCUMENTS 7,855,376 B2 * 12/2010 Cantin .................... G01P 13/00
250/559.29
2008/0055896 A1 * 3/2008 Feldmeier .............. H05B 31/50
362/231
(Continued)

FOREIGN PATENT DOCUMENTS

DE 102017129291 A1 6/2019

*Primary Examiner* — William J Carter
*Assistant Examiner* — Omar Rojas Cadima
(74) *Attorney, Agent, or Firm* — Muncy, Geissler, Olds & Lowe, P.C.

(57) ABSTRACT

An anti-glare headlamp for a motor vehicle, including a large number of light units, each of the light units having: a light source element, which is configured to emit light along a first optical axis in the direction of a space; a projection optic, which is disposed behind the light source element in the direction of the emitted light and is configured to project the light emitted by the light source element into the space at a solid angle; and a photodetector, which is situated in front of the projection optic in the direction of the emitted light and is configured to detect the light projected into the space by the projection optic and reflected from an object in the space, along a second optical axis back to the projection optic.

17 Claims, 1 Drawing Sheet

(51) Int. Cl.
  *F21S 41/67* (2018.01)
  *F21S 41/143* (2018.01)
  *F21S 41/65* (2018.01)

(58) Field of Classification Search
  CPC .. G01S 17/08; G01S 7/4817; G01S 2015/937;
       G01S 7/481; B60W 2554/4041; B60W
       2420/40; G01P 13/00; G02B 27/0037;
       G02B 27/0955; G02B 27/30; G08G 1/04;
       H04B 10/116; H04B 10/801; H05B
       45/10; H05B 45/12
  See application file for complete search history.

(56) References Cited

U.S. PATENT DOCUMENTS

| | | | |
|---|---|---|---|
| 2010/0191418 A1* | 7/2010 | Mimeault | H05B 45/10 701/36 |
| 2016/0082877 A1* | 3/2016 | Oberhammer | B60Q 1/0023 348/46 |
| 2019/0126813 A1* | 5/2019 | Hamlin | F21S 41/435 |

* cited by examiner

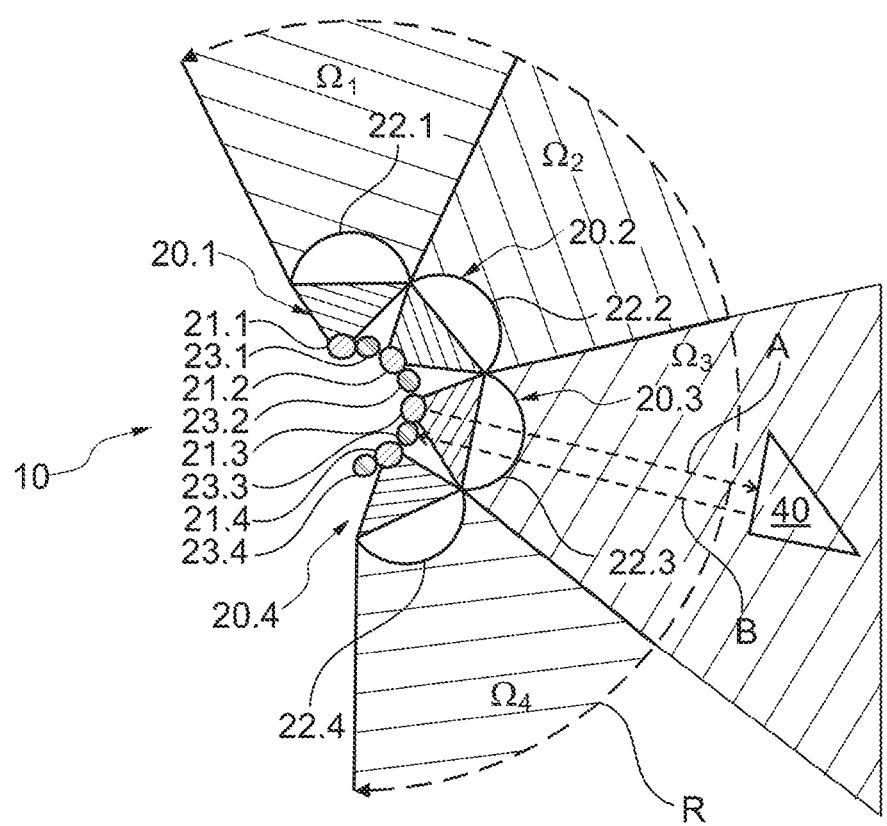
Fig. 1
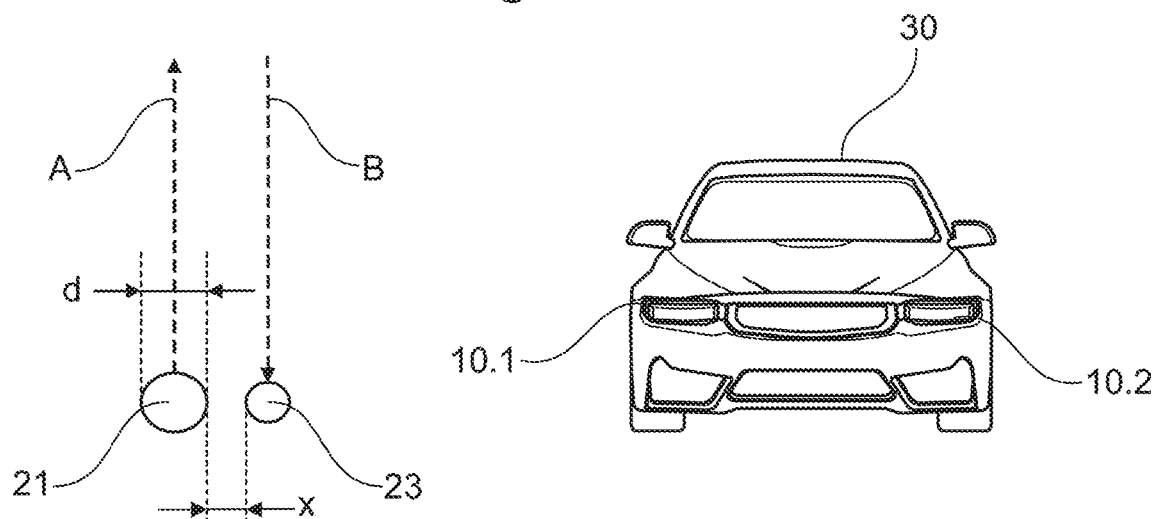
Fig. 2
Fig. 3

ANTI-GLARE HEADLAMP AND MOTOR VEHICLE

This nonprovisional application claims priority under 35 U.S.C. § 119(a) to German Patent Application No. 10 2019 124 200.2, which was filed in Germany on Sep. 10, 2019, and which is herein incorporated by reference.

BACKGROUND OF THE INVENTION

Field of the Invention

The present invention relates to an anti-glare headlamp for a motor vehicle and a motor vehicle having a headlamp of this type.

Description of the Background Art

Anti-glare headlamps from the prior art use camera systems disposed in the motor vehicle to detect objects, for example other road users or obstacles. A detection of these objects with the aid of the camera systems takes place to ascertain a corresponding light source element of the headlamp, which illuminates a solid angle in which the object is located, and to switch it off to avoid dazzling the object. An anti-glare light function may not be provided without detecting the object.

The known anti-glare headlamps have high procurement costs, due to the necessary camera systems. In addition, the detection of the objects with the aid of the camera systems is susceptible to errors and requires long computing times, so that the response times are not as short as desired and may cause a dazzling of a road user. Moreover, high computing capacities of a corresponding control unit of the anti-glare headlamp are necessary. Finally, the maximum detectable space around the motor vehicle is limited by the camera system and may be enlarged only by using multiple camera systems, which makes the known anti-glare headlamps even more cost-intensive.

SUMMARY OF THE INVENTION

It is therefore an object of the present invention to mitigate the disadvantages known from the prior art in headlamps for motor vehicles. In particular, the object of the invention is to provide an anti-glare headlamp for motor vehicles, which has low procurement costs, fast response times and a great spatial coverage.

According to an exemplary embodiment, the object of the invention is achieved by an anti-glare headlamp for a motor vehicle, which includes a large number of light units, each of the light units having: (a) a light source element, which is configured to emit light along a first optical axis in the direction of a space; (b) a projection optic, which is disposed behind the light source element in the direction of the emitted light and is configured to project the light emitted by the light source element into the space at a solid angle; and (c) a photodetector, which is disposed in front of the projection optic in the direction of the emitted light and is configured to detect the light projected into the space by the projection lens and reflected from an object in the space, along a second optical axis, back to the projection lens, and the headlamp being configured to end the emission of light of a light source element when the emitted light is reflected back and is detected by the photodetector of the light unit having the light source element.

According to the invention, one projection optic and one photodetector, which detects the light emitted by the light source element and passing bidirectionally through the projection optic upon reflection, are assigned to each light source element. The light detected by a photodetector may be assigned accordingly to the light source element assigned thereto and switched off. In other words, the object is detected within a solid angle by detecting the reflected light. A dazzling of the object detected in this way may be avoided thereby. The object is, in particular, a road user, and furthermore, in particular, a motor vehicle. By dispensing with expensive and complex camera systems, an anti-glare headlamp having low procurement costs is provided. Since an analysis of a recorded image, as recorded by camera systems, is eliminated, and only the emitted light is evaluated, the anti-glare headlamp according to the invention also provides faster response times. In addition, a high spatial coverage is comparatively cost-effectively achieved by integrating the photodetectors into the light units, due to the arrangement of light units around the motor vehicle.

In the case of the headlamp according to the invention, each photodetector is assigned to one light source element and, in addition, each projection optic is assigned to one light source element. Each light source element also has its own first optical axis. In other words, the first optical axis is different for each light source element. The light emitted by the light source element and the light reflected back from the object is the same light, which is only reflected back and detected by the particular photodetector.

The headlamp may include at least one control unit, or the headlamp is connected to a control unit of the motor vehicle, which is configured to control at least one of the light source elements. In particular, the control unit is configured to receive a detection signal of at least one of the photodetectors. The detection signal is transmitted from the photodetector to the control unit, when the photodetector detects light, in particular when it detects the light emitted by the light source element assigned to it and reflected on the object. The detection signal may contain information about light parameters such as light intensity, wavelength and frequency of the light. The control unit may be a control unit of the headlamp and be connected by control technology to all light units, in particular to the light source elements and the photodetectors. The control unit may additionally or alternatively also be a separate control unit of the light unit. Accordingly, each light unit may have its own control unit, which connects the light source element and the photodetector of the particular light unit to each other by control technology. The control unit is configured, in particular, to switch the light source elements on and off. Furthermore, the control unit is configured, in particular, to evaluate the detection signal of the photodetector and to convert it into an instruction for switching on the light source element (or causing it to be switched on) or switching of the light source element of the light unit of this photodetector. In particular, the control unit of the headlamp is configured to end the emission of light of a light source element when the emitted light is reflected back and is detected by the photodetector of the light unit having the light source element.

The light source elements can be configured to emit light for test purposes at a test point in time after the emission of light has ended and: (a) to continue emitting light if the light emitted for test purposes is not reflected back and is not detected by the photodetector of its light unit; and b) to re-emit light for test purposes at a later test point in time if the light emitted for test purposes is reflected back and detected by the photodetector of its light unit. The light emitted for test purposes is used to test whether the previously detected object is still within a solid angle of the light source element that was switched off, so as not to dazzle the detected object. This is a method sequence which is repeated until the detected object is no longer within the solid angle of the light source element. The light may be emitted for test purposes at fixed or variable intervals. The variable intervals may be determined, for example, as a function of the distance from the object. This allows an illumination of the solid angle of the particular light source element to take place again as quickly as possible. In the case of a motor vehicle having the headlamp according to the invention, this ensures that the light source elements of the headlamps are preferably switched on for a long time to permit safe travel.

A frequency of the light emitted for test purposes is below a flicker fusion frequency of the human eye. In other words, the light source elements are configured to emit the light emitted for test purposes at a frequency which is below the flicker fusion frequency of the human eye. This ensures that the object on which the emitted light is reflected is not dazzled. This prevents, for example, oncoming traffic from being dazzled from the front or traffic in front being dazzled from the rear.

The headlamp can be configured to evaluate whether the object is moving, based on the light emitted for test purposes, and in particular to ascertain the speed at which the object is moving. In particular, the control unit of the headlamp is configured to evaluate whether the object is moving, based on the light emitted for test purposes, and in particular to ascertain the speed at which the object is moving. This may take place, for example, by ascertaining the so-called time of flight. The time between the emission of the light by the light source element and the detection at the photodetector is measured. The time of the light or a light pulse of this type is correlated with the distance of the light source element from the object. Taking the host vehicle's speed into account, it may be determined upon consecutive ascertainment of the time of flight how fast the object on which the emitted light is reflected is moving toward the host motor vehicle. It may thus be determined, in particular, when the host motor vehicle will drive past the object for the purpose of switching the light source element on again or re-illuminating the switched-off solid angle. The headlamp, in particular the control unit, may furthermore be configured to evaluate a distance from the object, based on the light emitted for test purposes and the speed of the host motor vehicle.

Each of the projection optics can be configured to project light into the space at a solid angle which differs from the solid angles of the other projection optics or which predominantly differs from the solid angles of the other projection optics. Adjacent solid angles of the projection optics may slightly overlap to ensure a uniform illumination of the space. This ensures that an essentially separate solid angle is covered or illuminated by one light source element, so that only one light source element must be switched off for each solid angle when a photo detector of the light unit having the light source element detects the reflected light.

In addition, the photodetector of each light unit can be disposed next to the light source element of its light unit in the direction transversely to the particular first optical axis. In particular, the photodetector of each light unit may be disposed next to the light source element of its light unit in the direction orthogonally to the particular first optical axis. An arrangement is provided thereby, in which the first optical axes and the second optical axis are not functionally impaired.

Further, the first optical axis and the second optical axis may correspond to each other. Inaccuracies resulting, for example, from scattering light during the detection of the reflected light are minimized thereby, and the precision of the photodetector as a whole is increased.

The photodetector of each light unit can be disposed at a distance from the light source element of its light unit which corresponds to no more than three times a greatest side length or a diameter of a light emission surface of the light source element. Additionally or alternatively, the distance may correspond to a greatest side length or a largest radius of a projection surface of the projection optic of the light unit. The light emission surface of a light source element is the surface from which the light emerges from the light source element. Depending on the light source element, the light emission surface may have different shapes, for example round for a light conductor, for example an optical fiber, or rectangular for a laser. Accordingly, the diameter of the round light emission surface in a light source element having a round light emission surface, and a greatest side length of the rectangular surface in a light source element having a rectangular light emission surface is used as the measure for the distance between the photodetector and the light source element. This applies similarly to the projection surface, with the difference that the light is projected from the projection surface. Inaccuracies resulting, for example, from scattering light are also minimized thereby during the detection of the reflected light, and the precision of the photodetector as a whole is increased.

The headlamp can be configured to assign reflected-back light to the light source elements, based on at least one light parameter of the emitted light. In particular, a control unit of the headlamp is configured to assign reflected-back light to the light source elements, based on at least one light parameter of the emitted light. The at least one light parameter may be detected by the photodetector. Moreover, the at least one light parameter may be transmitted to the headlamp or the control unit as information. Based on a comparison of the at least one known light parameter of the light emitted by the light source element with the at least one light parameter of the light reflected on the object and detected by the photodetector, the headlamp or the control unit may then ascertain whether the detected light is the light emitted by the light source element of the light unit having the photo detector. The at least one light parameter may be, for example, a light intensity, a wavelength or a frequency. This makes it possible to avoid a light source element ending the emission of light, even though a scattered light or an extraneous light was detected by the detector instead of the reflected light.

Each of the light source elements can be configured to emit light at a point in time which differs from the point in time of the emission of the light of the other light source elements. In other words, each light source element emits the light or light pulses at a point in time, at which none of the other light source elements emits light or light pulses. In particular, the control unit of the headlamp is configured to assign the reflected light detected at the photodetectors based on the point in time of the emission of the light by the light source element of the light unit having the particular photodetector. The detected light may be distinguished thereby with the aid of a calculated time period from the emission of the light to the detection of the reflected light (time of flight). This also makes it possible to reliably assign the detected light to an emitted light and thus to a light source element.

Each of the light source elements can be configured to emit light at a frequency which differs from the frequency of the light of the other light source elements. In other words, each light source element emits light at a frequency, at which none of the other light source elements emits light. In particular, the control unit of the headlamp is configured to assign the reflected light detected at the photodetectors, based on a frequency of the light emitted by the light source element of the light unit having the particular photodetector. The detected light may be distinguished thereby from the lights of other light source elements with the aid of a unique frequency. This also makes it possible to reliably assign the detected light to an emitted light.

The light source elements can be designed as LEDs, laser-based and/or having a light conductor, and/or the emitted light is in the wavelength range visible to the human eye. In addition, the light source elements may be configured to emit a high beam, or the light source elements may be high-beam light source elements. Alternatively or additionally to the emission of light in the visible wavelength range, it is possible, for example, to emit infrared or ultraviolet light for the purpose of scanning the surroundings therewith.

The object of the invention is also achieved by a motor vehicle, which includes at least one headlamp according to the invention. The motor vehicle may be, for example, a motorcycle, a passenger car, a truck, a construction machine, an agricultural machine, etc.

The at least one headlamp can be configured so that all solid angles, at which the projection optics project light into the space, cover a 360° visual range around the motor vehicle. For this purpose, the motor vehicle may include, in particular, two, three, four or more headlamps. The motor vehicle may be, in particular, an agricultural machine. In the case of agricultural machines, an illumination of 360° around the motor vehicle is desirable and may be implemented with camera systems only at a very high procurement cost.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a schematic view of an exemplary embodiment of a headlamp according to the invention;

FIG. 2 shows a schematic view of an exemplary embodiment of a light unit of the headlamp from FIG. 1; and FIG. 3 shows a schematic front view of an exemplary embodiment of a motor vehicle according to the invention.

DETAILED DESCRIPTION

FIG. 1 shows a schematic view of an exemplary embodiment of a headlamp 10 according to the invention. Headlamp 10 includes four light units 20.1, 20.2, 20.3, 20.4. Each of light units 20.1, 20.2, 20.3, 20.4 includes one light source element 21.1, 21.2, 21.3, 21.4, one projection optic 22.1, 22.2, 22.3, 22.4 and one photodetector 23.1, 23.2, 23.3, 23.4. Light source elements 21.1, 21.2, 21.3, 21.4 and photodetectors 23.1, 23.2, 23.3, 23.4 are each disposed in front of projection optics 22.1, 22.2, 22.3, 22.4 in the direction of the light emitted by light source elements 21.1, 21.2, 21.3, 21.4. In this exemplary embodiment, light source elements 21.1, 21.2, 21.3, 21.4 and photodetectors 23.1, 23.2, 23.3, 23.4 are also disposed next to each other in the direction orthogonally to first optical axes A of light source elements 21.1, 21.2, 21.3, 21.4. Only first optical axis A of light source element 21.3 is drawn, while the first optical axes of remaining light source elements 21.1, 21.2, 21.4 are not shown for the sake of clarity. The light of light source element 21.3 is transmitted along first optical axis A. In each case, the light emitted by light source elements 21.1, 21.2, 21.3, 21.4 covers or illuminates a solid angle $\Omega_1$, $\Omega_2$, $\Omega_3$, $\Omega_4$ of space R indicated by the dashed line.

At an object 40, which may be, for example, a motor vehicle approaching on an oncoming lane, the light emitted by light source element 21.3 is reflected back through projection optic 22.3 to photodetector 23.3, which detects the light. Photodetector 23.3 is connected to light source element 21.3 with the aid of a control unit of headlamp 10, which is not illustrated. Upon detecting the light emitted by light source element 21.3, the control unit causes light source element 21.3 to be switched off so as not to dazzle object 40. The control unit compares light parameters, such as wavelength, frequency and light intensity, of the light emitted by light source element 21.3 with the those of the light detected at photodetector 23.3, which are transmitted by photodetector 23.3 to the control unit to ensure that the light detected by photodetector 23.3 is the light emitted by light source element 21.3. This avoids light source element 21.3 being switched off, even though there is no danger of an object being dazzled.

To determine the point in time, at which object 40 is no longer within solid angle $\Omega_3$ of light source element 21.3 of motor vehicle 30, so that light source element 21.3 may be switched on again, light may be emitted by light source element 21.3 for test purposes at a frequency below the flicker fusion frequency of the human eye. Once the light emitted for test purposes is no longer reflected back and detected by photodetector 23.3, the control unit instructs light source element 21.3 to continue emitting light above the flicker fusion frequency, since it may then be concluded that object 40 is no longer within solid angle $\Omega_3$ of light source element 21.3.

FIG. 2 shows a schematic view of an alternative embodiment variant of a light unit 20 of headlamp 10 from FIG. 1. Unlike in FIG. 1, light source element 21 is not disposed directly next to photodetector 23. Instead, photodetector 23 is disposed at a distance x from light source element 21. In this exemplary embodiment, distance x is half the diameter d of a light emission surface of light source element 21.

FIG. 3 shows a schematic front view of an exemplary embodiment of a motor vehicle 30 according to the invention, which includes two anti-glare headlamps 10.1, 10.2 according to the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An anti-glare headlamp for a motor vehicle, the headlamp comprising:

at least two light units, each of the at least two light units comprising:
  a light source element, which is configured to emit light along a first optical axis in a direction of a space;
  a projection optic, which is disposed behind the light source element in the direction of the emitted light and is configured to project the light emitted by the light source element into the space at a solid angle; and
  a photodetector, which is disposed in front of the projection optic in the direction of the emitted light and is configured to detect a light projected by the projection optic into the space and reflected back to the projection optic from an object in the space along a second optical axis,
  wherein the headlamp is configured to end the emission of light of the light source element when the emitted light is reflected back and is detected by the photodetector of the light unit having the light source element.

2. The headlamp according to claim 1, wherein the headlamp includes at least one control unit, or wherein the headlamp is connected to a control unit of the motor vehicle, which is configured to control at least one of the light source elements.

3. The headlamp according to claim 1, wherein the light source elements are configured to emit light for test purposes at a test point in time after the emission of light has ended and to continue emitting light if the light emitted for test purposes is not reflected back and is not detected by the photodetector of the light unit and to re-emit light for test purposes at another test point in time if the light emitted for test purposes is reflected back and is detected by the photodetector of the light unit.

4. The headlamp according to claim 3, wherein a frequency of the light emitted for test purposes is below a flicker fusion frequency of the human eye.

5. The headlamp according to claim 3, wherein the headlamp is configured to evaluate whether the object is moving and/or to ascertain a speed at which the object is moving based on the light emitted for test purposes.

6. The headlamp according to claim 1, wherein the solid angle of each of the projection optics differs from one another.

7. The headlamp according to claim 1, wherein the photodetector of each light unit is disposed next to the light source element of the light unit in a direction transverse to the first optical axis.

8. The headlamp according to claim 1, wherein the first optical axis and the second optical axis correspond to each other.

9. The headlamp according to claim 1, wherein the photodetector of each light unit is disposed at a distance from the light source element of the light unit, which corresponds to no more than three times a greatest side length or a diameter of a light emission surface of the light source element.

10. The headlamp according to claim 1, wherein the headlamp is configured to assign reflected-back light to the light source elements based on a light parameter of the emitted light.

11. The headlamp according to claim 1, wherein each of the light source elements is configured to emit light at a point in time which differs from the point in time of the emission of the light of the other light source elements.

12. The headlamp according to claim 1, wherein each of the light source elements is configured to emit light at a frequency which differs from the frequency of the light of the other light source elements.

13. The headlamp according to claim 1, wherein the light source elements are designed as LEDs, laser-based and/or having a light conductor, and/or the emitted light is in the wavelength range visible to the human eye.

14. A motor vehicle comprising at least one headlamp according to claim 1.

15. The motor vehicle according to claim 14, wherein the at least one headlamp is configured so that all solid angles, at which the projection optics project light into the space, cover a 360° visual range around the motor vehicle.

16. The motor vehicle according to claim 1, wherein the light source element has an assigned light source parameter, and wherein the assigned light source parameter is compared with a light source parameter of the reflected back light detected by the photodetector and if the light source parameter of the reflected back light matches the assigned light source parameter, the headlamp ends the emission of light of the light source element.

17. The motor vehicle according to claim 16, wherein the assigned light source parameter is light intensity, wavelength or frequency.

* * * * *